(12) United States Patent
Whitworth et al.

(10) Patent No.: US 8,808,823 B2
(45) Date of Patent: Aug. 19, 2014

(54) DEVICE AND METHOD FOR REPAIRING STRUCTURAL COMPONENTS

(75) Inventors: Denver Whitworth, North Richland Hills, TX (US); Brian French, Roanoke, TX (US); Vance Cribb, Grapevine, TX (US)

(73) Assignee: Textron Innovatons Inc., Providence, RI (US)

( * ) Notice: Subject to any disclaimer, the term of this patent is extended or adjusted under 35 U.S.C. 154(b) by 10 days.

(21) Appl. No.: 13/437,665

(22) Filed: Apr. 2, 2012

(65) Prior Publication Data

US 2012/0189807 A1 Jul. 26, 2012

Related U.S. Application Data

(62) Division of application No. 12/300,052, filed as application No. PCT/US2006/018240 on May 11, 2006, now Pat. No. 8,152,952.

(51) Int. Cl.
| | |
|---|---|
| B29C 73/00 | (2006.01) |
| B32B 43/00 | (2006.01) |
| B29C 65/00 | (2006.01) |
| B32B 37/00 | (2006.01) |
| B32B 38/04 | (2006.01) |
| E02D 37/00 | (2006.01) |
| E04G 23/00 | (2006.01) |
| E04C 2/54 | (2006.01) |
| B32B 3/26 | (2006.01) |

(52) U.S. Cl.
USPC ............... 428/63; 156/94; 156/252; 156/293; 52/514; 52/787.1

(58) Field of Classification Search
USPC ........... 156/60, 91, 92, 94, 98, 153, 293, 294, 156/296, 303.1, 391; 16/2.1, 2.5; 52/514, 52/514.5, 782.1, 787.1; 264/36.1; 428/63; 411/82, 82.1, 82.2, 82.3
See application file for complete search history.

(56) References Cited

U.S. PATENT DOCUMENTS 3,252,493 A * 5/1966 Smith ........................... 411/108
4,112,993 A 9/1978 Dey
(Continued)

FOREIGN PATENT DOCUMENTS

| GB | 2169372 | 7/1986 |
|---|---|---|
| GB | 2169372 A | 7/1986 |

(Continued)

OTHER PUBLICATIONS

Restriction Requirement from counterpart U.S. Appl. No. 12/300,052, issued by the USPTO on Nov. 26, 2010.

(Continued)

*Primary Examiner* — Philip Tucker
*Assistant Examiner* — Brian R Slawski
(74) *Attorney, Agent, or Firm* — James E. Walton; Richard G. Eldredge

(57) ABSTRACT

A device and method to repair a structural component. The device includes a plug that bonds to the structural component. The plug includes a flange and a solid shank extending from the flange, the solid shank being disposable in an opening of the structural component. The device further includes disc that bonds to the structural component such that, when bonded, the disc covers the solid shank of the plug. The method includes bonding the plug to the structural component such that the solid shank of the plug is disposed in the opening of the structural component. The method further includes bonding the disc to the structural component.

4 Claims, 5 Drawing Sheets

(56) References Cited

U.S. PATENT DOCUMENTS

| | | | |
|---|---|---|---|
| 4,577,450 A * | 3/1986 | Large | 52/787.12 |
| 4,817,264 A | 4/1989 | Worthing | |
| 5,093,957 A * | 3/1992 | Do | 16/2.1 |
| 2005/0125946 A1 * | 6/2005 | Sucic et al. | 16/2.1 |

FOREIGN PATENT DOCUMENTS

| | | |
|---|---|---|
| JP | 08169057 | 7/1996 |
| JP | 2002302121 | 10/2002 |

OTHER PUBLICATIONS

Response to Restriction Requirement from counterpart U.S. Appl. No. 12/300,052 dated Dec. 9, 2010.
Non-Final Office Action from counterpart U.S. Appl. No. 12/300,052, issued by the USPTO on Dec. 29, 2010.
Amendment from counterpart U.S. Appl. No. 12/300,052 dated Apr. 28, 2011.
Final Office Action from counterpart U.S. Appl. No. 12/300,052, issued by the USPTO on Jul. 22, 2011.
Amendment After Final from counterpart U.S. Appl. No. 12/300,052 dated Sep. 1, 2011.
Advisory Action from counterpart U.S. Appl. No. 12/300,052 dated Sep. 12, 2011.
Notice of Allowance from counterpart U.S. Appl. No. 12/300,052, issued by the USPTO on Dec. 9, 2011.
Notice to File Corrected Application Papers from counterpart U.S. Appl. No. 12/300,052, issued by the USPTO on Jan. 17, 2012.
Amendment from counterpart U.S. Appl. No. 12/300,052 dated Jan. 19, 2012.
Office Action from counterpart Japanese Application No. 2009-509526, issued by the JP Patent Office on May 18, 2011.
Office Action from counterpart Canadian Application No. 2,650,272, issued by the CA Patent Office on Aug. 26, 2010.
Office Action from counterpart Canadian Application No. 2,650,272, issued by the CA Patent Office on Jun. 8, 2011.
Extended European Search Report from corresponding Application 06759562.9-1262 issued by the European Patent Office dated Nov. 29, 2012, 10 pages.
D.H. Middleton, Composite Materials in Aircraft Structures, Chapter 13.
European Search Report dated Jul. 6, 2013 from counterpart EP App. No. 06759562.9.
Canadian Office Action dated Aug. 30, 2013 from counterpart CA App. No. 2,777,788.

* cited by examiner

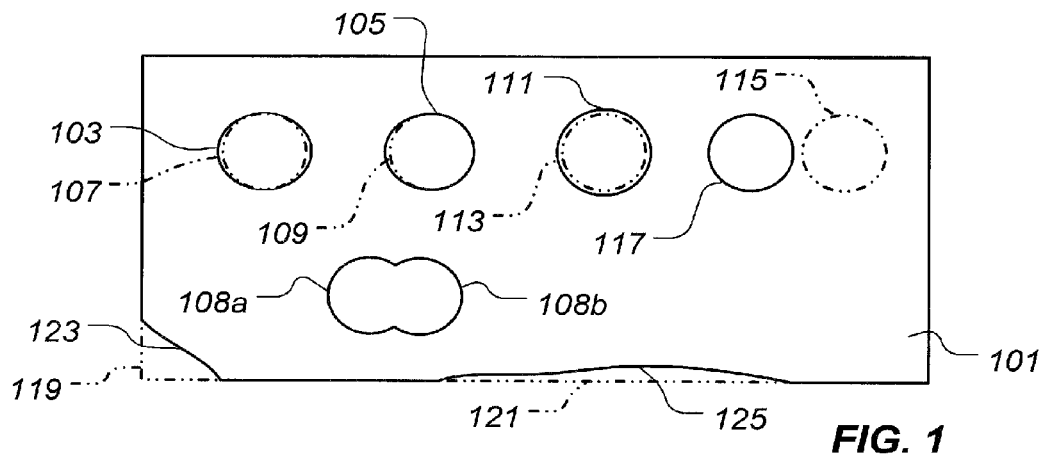
FIG. 1
(PRIOR ART)
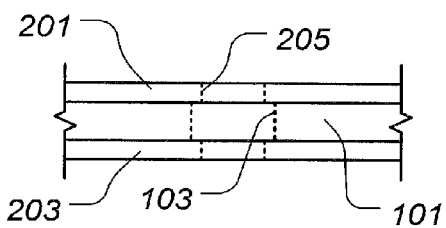
FIG. 2
(PRIOR ART)
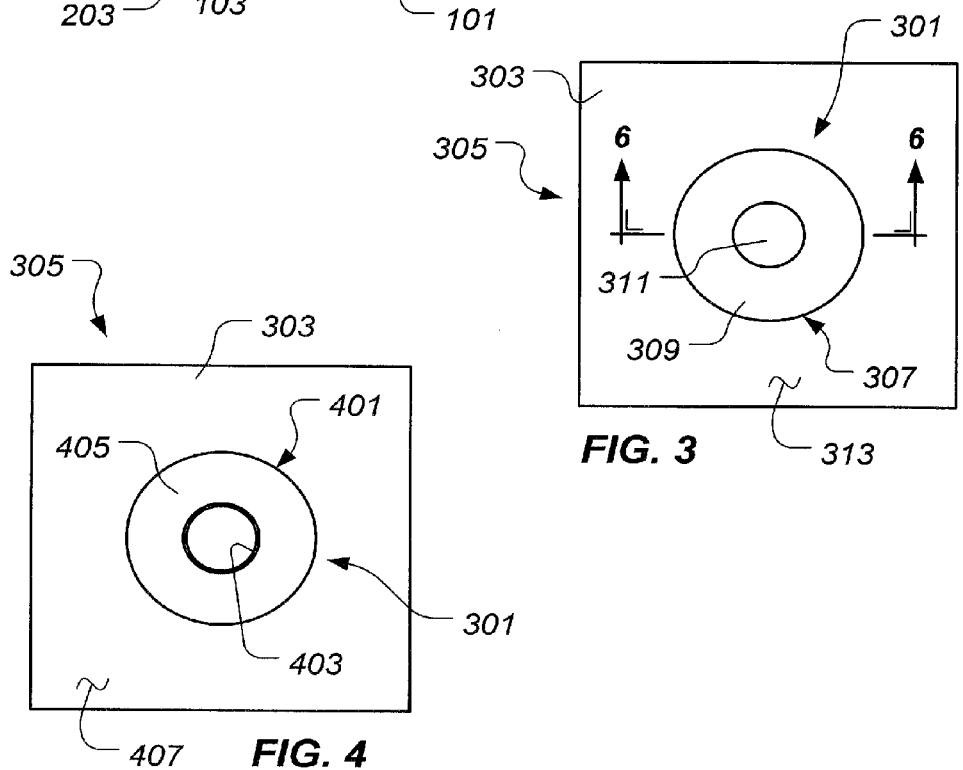
FIG. 3
FIG. 4

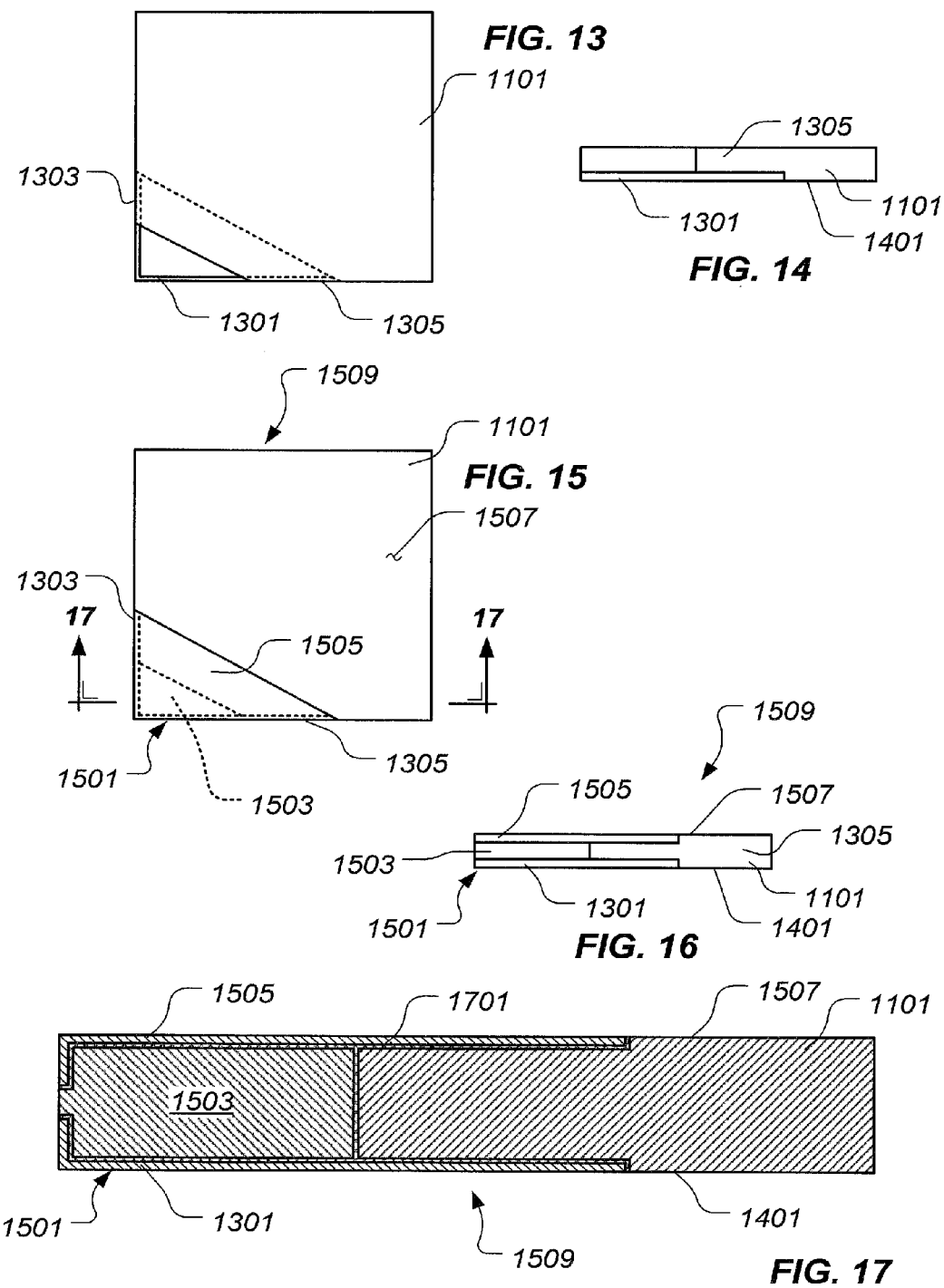

DEVICE AND METHOD FOR REPAIRING STRUCTURAL COMPONENTS

CROSS REFERENCE TO RELATED APPLICATIONS

This application is a divisional of U.S. application Ser. No. 12/300,052, filed 7 Nov. 2008, now U.S. Pat. No. 8,152,952, titled "Device and Method for Repairing Structural Components," which is a national-stage application of International PCT Application No. PCT/US2006/018240, filed 11 May 2006, titled "Device and Method for Repairing Structural Components," all of which are both hereby incorporated by reference for all purposes as if fully set forth herein.

BACKGROUND

1. Field of the Present Description

The present invention relates in general to the field of repairing structural components.

2. Description of Related Art

Structural components often are damaged during manufacture or while in service. If damage to a structural component affects the structural integrity of the component or undesirably affects the ability for loads to be transmitted between the structural component and other structural components, the structural component is replaced or repaired. Replacement is sometimes cost prohibitive and/or is very difficult to accomplish. For example, the tooling required to replicate a part may no longer exist. In some circumstances, therefore, repair is highly desirable over replacement. It is very important that the repair made to the structural component result in a repaired component that exhibits mechanical properties (e.g., tensile strength, stiffness, etc.) that are at least comparable to the original, unrepaired, undamaged structural component.

Proper repair is particularly important when addressing damage in airframe components. Improper repair may directly lead to a failure of an airframe component and, in extreme cases, loss of the aircraft. Moreover, it is highly desirable for repairs to airframe components to be a weight efficient as possible, so that the payload of the aircraft is not adversely affected.

FIG. 1 depicts a structural component 101 exhibiting various exemplary types of damage that may be incurred during manufacture and/or in service. Note that, for each of the defect examples exhibited by structural component 101, the desired configuration of structural component 101 is shown in phantom. For example, structural component 101 may define an elongated fastener hole 103 or 105, rather than substantially round fastener holes 107 and 109, respectively. Elongated fastener holes 103, 105 are positioned substantially correctly with respect to other features of structural component 101 but are not shaped appropriately. Elongated fastener holes 103, 105 may be produced by inferior drilling processes during manufacture. Alternatively, proper, round fastener holes 107, 109 may become elongated (i.e., become elongated fastener holes 103, 105, respectively) while in service as a result of structural component 101 moving with respect to fasteners (not shown) extending through round fastener holes 107, 109.

Moreover, during manufacture, a fastener hole 111 that is larger in diameter than a desired fastener hole 113 may be drilled or otherwise generated in structural component 101. If structural component 101 is attached to another structural component (not shown) by a fastener (also not shown) extending through enlarged fastener hole 111, structural component 101 may not be sufficiently affixed to the other structural component, thus allowing structural component 101 to move with respect to the fastener or with respect to the other structural component. Furthermore, a desired fastener hole 115 may actually be produced in structural component 101 at an undesired location, as fastener hole 117, thus preventing structural component 101 from being attached to other structural components. In some situations two (or more) overlapping holes 118a and 118b may be generated in structural component 101. Whether either of holes 118a and 118b is in a desirable location, having overlapping holes is not acceptable. This undesirable configuration is often referred to as a "double-drilled" hole.

Corners and other edges of structural component 101 may also be damaged during manufacture or while in service. For example, a corner portion 119 and/or an edge portion 121 of structural component 101 may be broken off, worn away, or otherwise undesirably removed from structural component 101, leaving structural component 101 with improper edges 123, 125, respectively. In particular, structural component 101 may be trimmed or cut incorrectly, producing edges 123 and/or 125. Structural component 101 may not perform as designed because portion 119 or 121 is missing.

One way of repairing damaged structural components is to add additional structural components, often known as "doublers," to reinforce the damaged structural component. For example, as shown in FIG. 2, a first doubler 201 and a second doubler 203 are added to structural component 101 so that a properly-sized fastener hole 205 can be provided for attaching structural component 101 to another structural component. The addition of such doublers, however, changes the effective thickness of structural component 101 to include the thicknesses of doublers 201 and 203. In assemblies wherein thickness of structural component 101 is important, such as in assemblies that include interchangeable and/or replaceable structural components, the use of doublers may not be possible.

Moreover, such conventional repair techniques may be difficult to accomplish in the field. Field repairs require techniques that can be accomplished without significant equipment or special environments.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote (s) the first figure in which the respective reference numerals appear, wherein:

FIG. 1 is a top, plan view of a structural component of the prior art exhibiting various exemplary hole and edge damage;

FIG. 2 is a side, elevational view of the structural component of FIG. 1 with doublers attached thereto;

FIG. 3 is a top, plan view of a repaired structural component including a first illustrative embodiment of a structural component repair device according to the present invention;

FIG. 4 is a bottom, plan view of the repaired structural component of FIG. 3;

FIG. 13 is a top, plan view of the structural component of FIG. 11 to which a lower tray of a fourth illustrative embodiment of a structural component repair device of the present invention has been applied;

FIG. 14 is a side, elevational view of the structural component of FIG. 11 and the lower tray of FIG. 13;

FIG. 15 is a top, plan view of the structural component of FIG. 11 to which the lower tray (of FIG. 13) and an upper tray of the fourth illustrative embodiment of the structural component repair device of the present invention, as well as a replacement structural portion, has been applied;

FIG. 16 is a side, elevational view of the structural component of FIG. 11 and the lower tray, the upper tray, and the replacement structural portion of FIG. 15;

FIG. 17 is a cross-sectional view of the structural component of FIG. 11, repaired with the fourth illustrative embodiment of the structural component repair device of FIG. 15, taken along the line 17-17 of FIG. 15.

Figure 5:
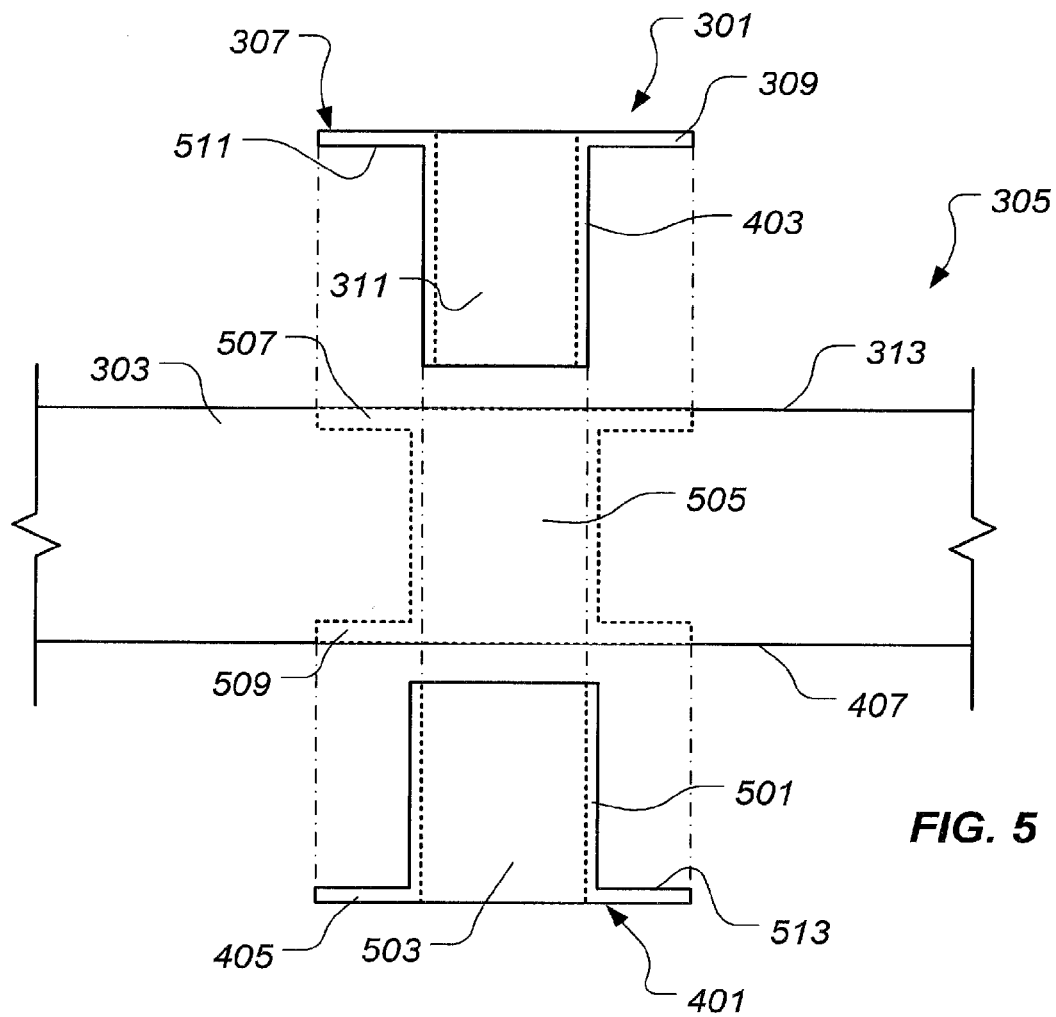
FIG. 5 is an exploded, side, elevational view of the repaired structural component of FIG. 3.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention represents a device for repairing a structural component and a method of using the device. In one embodiment, the device fills a portion of a hole, such as a defective fastener hole, defined by the structural component. The device, when installed, defines a new fastener hole for use in fastening the structural component to another component in an assembly. In another embodiment, the device substantially fills all of a hole, such as a defective fastener hole, defined by the structural component. A new hole is then generated through the repair device and the structural component. In yet another embodiment, the device is attached to opposing sides of the structural component with a replacement structural portion attached therebetween.

As noted above, it may be desirable to repair a structural component having a defective opening, such as a fastener hole, to have a new such opening. Accordingly, FIGS. 3-6 depict a first illustrative embodiment of a device 301 according to the present invention for repairing a defective structural component 303, forming repaired structural component 305. It should be noted that, in the following description, the leftmost significant digit(s) in the reference numerals denote(s) the first figure in which the respective reference numerals appear. In the illustrated embodiment, device 301 comprises a first member 401 slidingly mated with a second member 307. First member 401 comprises a flange 405 and a sleeve 501 extending from flange 405. First member 401, by way of flange 405 and sleeve 501, defines a passageway 503 therethrough. Second member 307 comprises a flange 309 and a sleeve 403 extending from flange 309. Second member 307, by way of flange 309 and sleeve 403, defines a passageway 311 therethrough. In use, sleeve 403 of second member 307 slides into passageway 503 of first member 401.

Referring now in particular to FIG. 5, structural component 303 defines an opening 505 therethrough. Opening 505 may be an elongated or otherwise defective hole, such as a fastener hole 103 or 105 of FIG. 1, or may be a newly-formed hole that has an inappropriate diameter, such as fastener hole 111 of FIG. 1. Moreover, it may be desirable in certain situations to enlarge a defective hole or opening to remove damaged material adjacent the opening. For example, if structural component 303 comprises a composite material, structural component 303 may be delaminated adjacent a defective hole, such as fastener hole 103 or 105 of FIG. 1. Thus, it may be desirable to drill a new hole (i.e., opening 505) in the same location as the defective hole but having a larger diameter to remove the delaminated material. Moreover, if the holes are overlapping (e.g., holes 118a and 118b in FIG. 1) it is desirable to drill a new hole (i.e., opening 505) encompassing the overlapping holes.

Still referring to FIG. 5, it may be desirable for any repair to structural component 303 to be substantially flush with an upper surface 313 of structural component 303 and/or substantially flush with a lower surface 407 of structural component 303. Accordingly, in the illustrated embodiment, structural component 303 is counterbored, generally at 507 and/or at 509, to receive flanges 309 and 405, respectively. It should be noted, however, that the present invention does not require flanges 309, 405 to be recessed into structural component 303. Rather, flanges 309, 405 may extend above surfaces 313, 407, respectively, of structural component 303.

After opening 505 is prepared, if any preparation is needed, an adhesive is applied to portions of structural component 303 defining counterbores 507, 509 and or to lower surfaces 511, 513 of flanges 309, 405, respectively. If structural component 303 is not counterbored and it is desirable for adhesive to be applied to structural component 303, then adhesive is applied to upper surface 313 and lower surface 407 of structural component 303 in locations that will be under flanges 309, 405. Preferably, adhesive is applied to sleeve 501 of first member 401 and/or to opening 505 of structural component 303.

After adhesive has been applied, first member 401 is placed into opening 505 of structural component 303, such that flange 405 is received into counterbore 509. If counterbore 509 is omitted, first member 401 is placed into opening 505 such that lower surface 513 of flange 405 is proximate lower surface 407 of structural component 303 with adhesive therebetween. Second member 307 is then placed into passageway 503 of first member 401, such that flange 309 of second member 307 is received in counterbore 507. If counterbore 507 is omitted, second member 307 is placed into passageway 503 such that lower surface 511 of flange 309 is proximate upper surface 313 of structural component 303 with adhesive therebetween.

Figure 6:
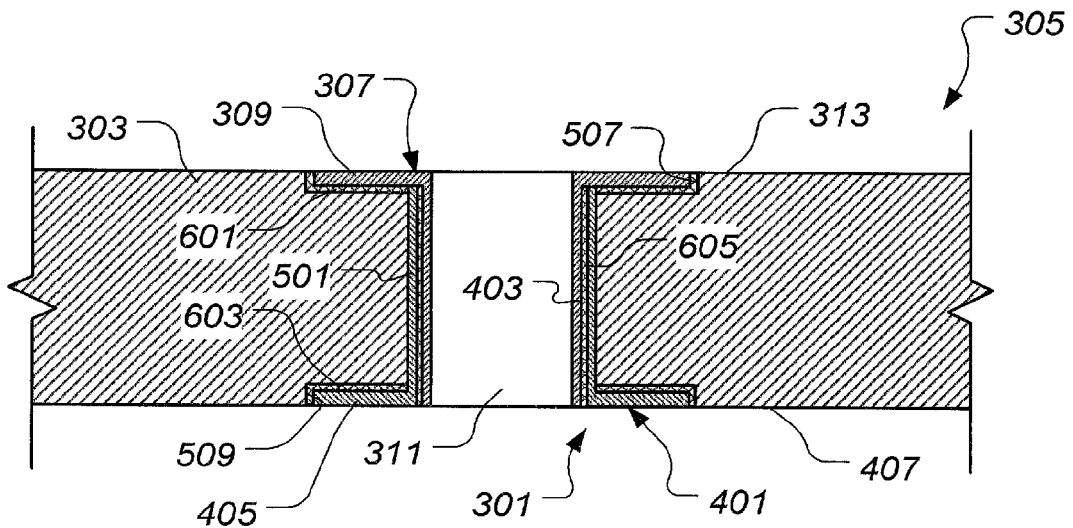
FIG. 6 is a cross-sectional view of the repaired structural component of FIG. 3, taken along the line 6-6 of FIG. 3.
Figure 7:
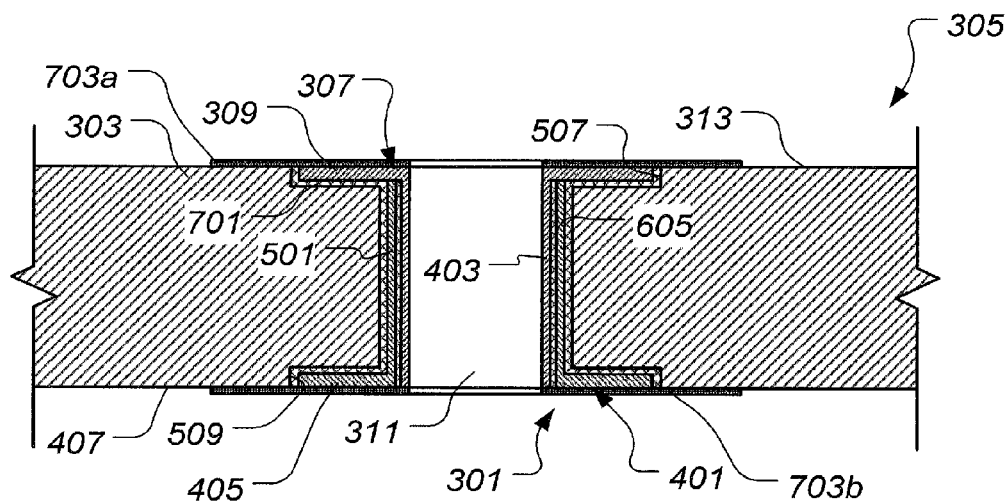
FIG. 7 is a cross-sectional view, corresponding to the view of FIG. 6, of the structural component of FIG. 3 illustrating a preferred bonding configuration.

FIG. 6 depicts device 301 operably associated with structural component 303 to form repaired structural component 305. In the illustrated embodiment, a first adhesive layer 601 is disposed between flange 405 of first member 401 and structural component 303 and a second adhesive layer 603 is disposed between flange 309 of second member 307 and structural component 303. Preferably, however, as shown in FIG. 7 and discussed above, an adhesive layer 701 extends between device 301 and structural component 303 to retain device 301 with structural component 303. Moreover, it is preferable for first member 401 to be adhesively bonded to second member 307 by an adhesive layer 605. In one embodiment, a fastener (not shown) is disposed through passageway 311 defined by second member 307 so that repaired structural component 305 may be attached to another member or component. Accordingly, the diameter of passageway 311 is sized appropriately for the fastener to be used. An outer diameter of sleeve 501 of first member 401 is sized to appropriately fill opening 505 with adhesive layer 701 disposed between sleeve 501 and structural component 303, if adhesive layer 701 is present. The outer diameter of sleeve 501 is sized to substantially fill opening 505 if no adhesive layer 701 is employed between sleeve 501 and structural component 303. If device 301 is operably associated with a fastener to fasten repaired structural component 305 to another member or component, flanges 309 and 405 preferably exhibit outer diameters of at least two times the diameter of passageway 311 of second member 307.

In some situations, such as when device 301 is used in assemblies comprising composite materials, it may be desirable to cover device 301 with a cover plies 703a, 703b to inhibit corrosion. Preferably, each cover ply 703a or 703b comprises a single ply of woven fabric (e.g., fiberglass or the like) pre-impregnated with a resin compatible with the material of structural component 303 to minimize the change in thickness of repaired structural component 305 over structural component 303.

Figure 8:
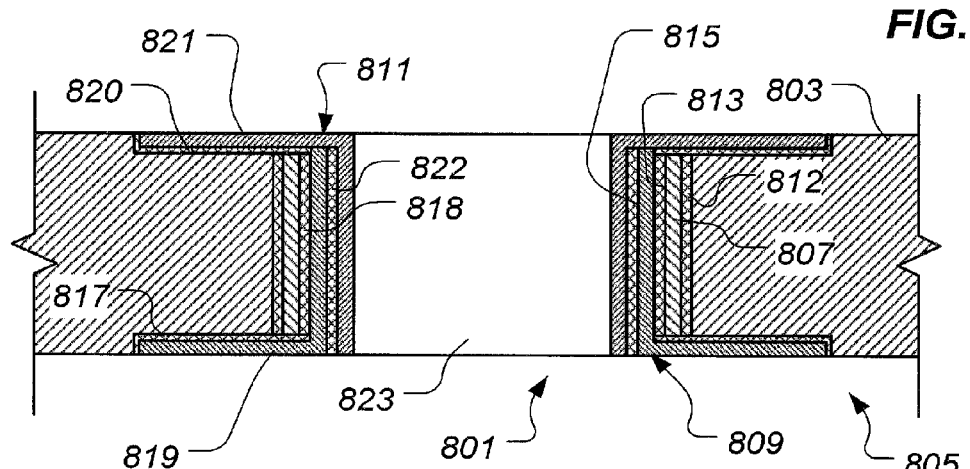
FIG. 8 is a cross-sectional view, corresponding to the view of FIG. 6, of a repaired structural component including a second illustrative embodiment of a structural component repair device according to the present invention.

It may be desirable to limit the number of size combinations of first member 401 and second member 307 required to repair the multitude of sizes of openings 505 of structural component 303. Accordingly, FIG. 8 depicts a second illustrative embodiment of a device 801 according to the present invention for repairing a defective structural component 803, forming repaired structural component 805. Device 801 comprises a spacer sleeve 807, a first member 809, and a second member 811. First member 809 and second member 811 correspond to first member 401 and second member 307, respectively, of FIGS. 3-7. Spacer sleeve 807 may be produced in many different outer diameter sizes to accommodate the multitude of sizes of openings 505 of structural component 303 while having only a single or a few inner diameter sizes to cooperate with first and second members 809, 811.

To assemble device 801, spacer sleeve 807 is placed in opening 505 defined by structural component 303, and adhesively bonded to structural component 803 by an adhesive layer 812 prior to installing first member 809 and second member 811. First member 809 is then inserted into a passageway 813 defined by spacer sleeve 807, adhesively bonded to structural component 803 by an adhesive layer 817, and adhesively bonded to spacer sleeve 807 by an adhesive layer 818. Second member 811 is then inserted into a passageway 815 defined by first member 809, adhesively bonded to structural component 803 by an adhesive layer 820, and adhesively bonded to first member 809 by an adhesive layer 822. In one embodiment, a passageway 823 defined by second member 811 is configured to receive a fastener (not shown) for attaching repaired structural component 805 to another member or component.

Figure 9:
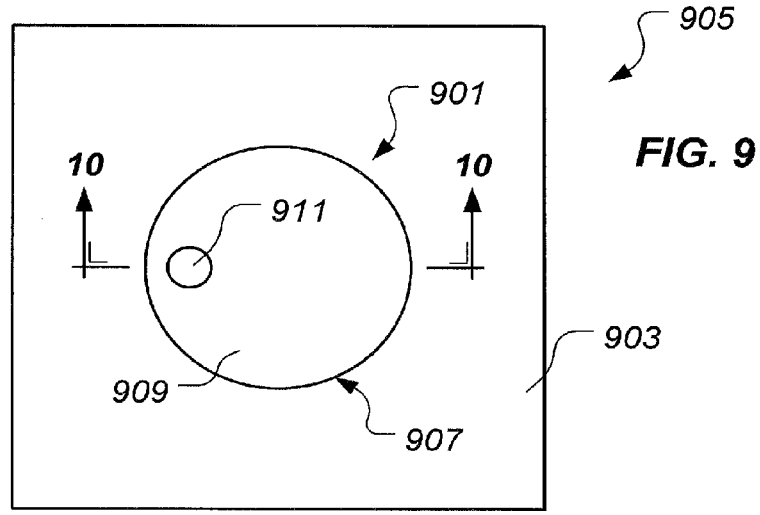
FIG. 9 is a top, plan view of a repaired structural component including a third illustrative embodiment of a structural component repair device according to the present invention.
Figure 10:
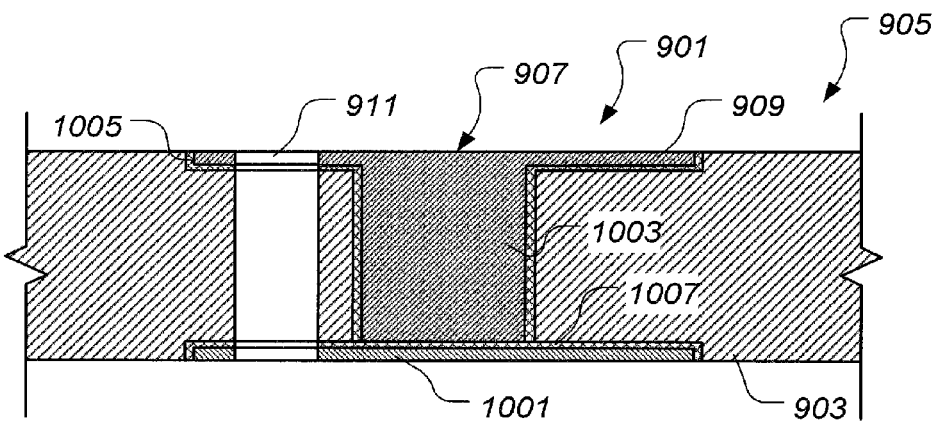
FIG. 10 is a cross-sectional view of the repaired structural component of FIG. 9, taken along the line 10-10 of FIG. 9.

As discussed above, it may be desirable to substantially fill a defective opening or hole in a structural component and provide a new opening or hole in another location in the structural component but proximate the defective opening or hole. Accordingly, FIGS. 9 and 10 depict a third illustrative embodiment of a device 901 according to the present invention for repairing a defective structural component 903, forming repaired structural component 905. In the illustrated embodiment, device 901 comprises a plug 907 and a disc 1001. Plug 907 comprises a flange 909 and a solid shank 1003 extending from flange 909. Preferably, flange 909 and disc 1001 are recessed into structural component 903. Device 901 is adhesively bonded to structural component 903. Preferably, an adhesive layer 1005 extends along substantially all of an interface between plug 907 and structural component 903. Alternatively, plug 907 may be adhesively bonded to structural component 903 at flange 909. Disc 1001 is adhesively bonded to solid shank 1003 of plug 907 and to structural component 903 by an adhesive layer 1007.

With device 901 installed as shown in FIGS. 9 and 10, a new opening 911 through flange 909, adhesive layer 1005, structural component 903, and disc 1001 can be generated. In one embodiment, opening 911 is a fastener opening.

Figure 11:
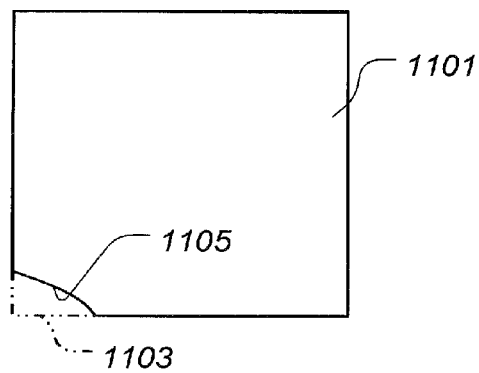
FIG. 11 is a top, plan view of a structural component exhibiting edge damage that is to be repaired using a structural component repair device of the present invention.
Figure 12:
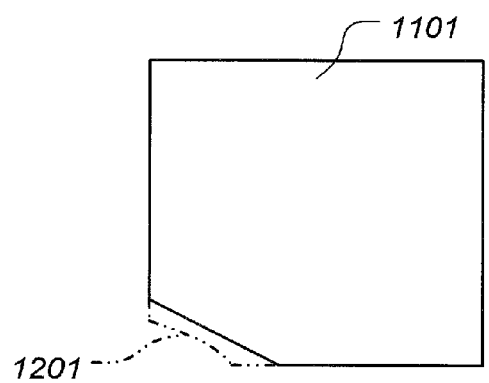
FIG. 12 is a top, plan view of the structural component of FIG. 11 in which the damaged portion has been removed.

While the embodiments described above are useful in repairing defective holes or openings defined by structural components, the scope of the present invention is not so limited. Rather, the present invention contemplates a device for repairing edge defects, such as those depicted in FIG. 1. FIGS. 11-17 depict a method according to the present invention of repairing a defective structural component 1101 using a structural component repair device 1501. As shown in FIG. 11, a corner 1103 (shown in phantom) of structural component 1101 has been broken away from structural component 1101. Referring now to FIG. 12, in some situations it is desirable to remove a further portion 1201 (shown in phantom) from structural component 1101. It is particularly advantageous to remove further material if structural component 1101 includes damaged material proximate a broken edge 1105.

In FIGS. 13 and 14, a lower tray 1301 of device 1501 has been adhesively bonded to a lower surface 1401 of structural component 1101 and to edges 1303, 1305 of structural component 1101. In FIGS. 15 and 16, a replacement portion 1503 is adhesively bonded to lower tray 1301, to structural component 1101, and to an upper tray 1505 of device 1501. Upper tray 1505 is also adhesively bonded to an upper surface 1507 of structural component 1101 and to edges 1303, 1305 of structural component 1101. A repaired structural component 1509 comprises structural component 1101, replacement portion 1503, and device 1501 (i.e., upper tray 1505 and lower tray 1301) adhesively bonded to structural component 1101 and replacement portion 1503.

FIG. 17 depicts, in cross-section, one particular embodiment of repaired structural component 1509. As shown in FIG. 17, structural component 1101 and replacement portion 1503 are preferably recessed to accommodate device 1501. Replacement portion 1503 is adhesively bonded to upper tray 1505, lower tray 1301, and structural component 1101 by an adhesive layer 1701. Upper tray 1505 and lower tray 1301 are also adhesively bonded to structural component 1101 by adhesive layer 1701. While adhesive layer 1701 is shown in FIG. 17 as being contiguous, the scope of the present invention is not so limited. Rather, adhesive layer 1701 may comprise a plurality of separate adhesive layers bonding device 1501 and replacement portion 1503 to structural component 1101. Also, note that a cover ply (e.g., cover ply 703a or 703b of FIG. 7) may be applied over upper tray 1505 and/or lower tray 1301, as described above in relation to FIG. 7.

Figure 18:
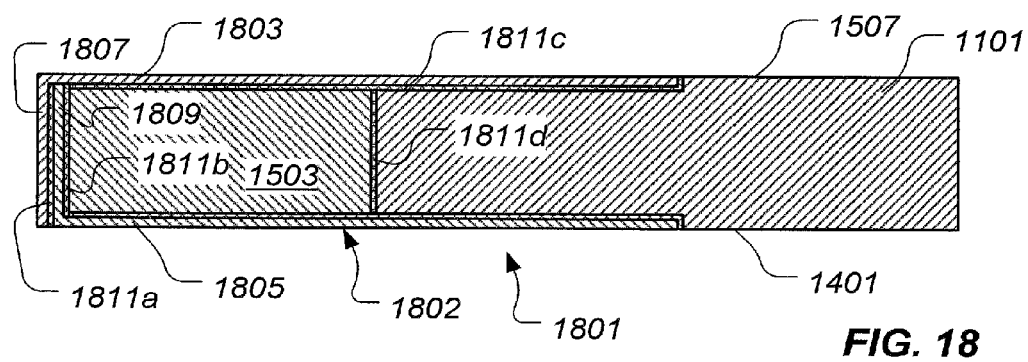
FIG. 18 is a cross-sectional view of the structural component of FIG. 11, repaired with an alternative embodiment of the structural component repair device of FIG. 15, taken along the line 17-17 of FIG. 15.

FIG. 18 depicts an embodiment alternative to that of FIG. 17. In FIG. 18, a repaired structural component 1801 comprises a structural component repair device 1802 having an upper tray 1803 and a lower tray 1805. Flanges 1807 and 1809 of upper tray 1803 and lower tray 1805, respectively overlap and are adhesively bonded to one another, edges 1303 and 1305 of structural component 1101, and an edge 1811 of replacement portion 1503 by adhesive layers 1811a-1811d. In other respects, the embodiment of FIG. 18 generally corresponds to the embodiment of FIG. 17.

It should be noted that surfaces of the device (e.g., devices 301, 801, 901, 1501, or the like) that are to be adhesively bonded to another component (e.g., structural component 303, 803, 903, 1101, or the like) may be textured to improve adhesion of the adhesive. Examples of such texturing include roughening by grit (or other media) blasting and knurling.

It should also be noted that the device (e.g., devices 301, 801, 901, 1501, or the like) according to the present invention for repairing a defective structural component may comprise many different materials. The selection of a particular material for the device is implementation specific. For example, if the structural component (e.g., structural component 303, 803, 903, 1101, or the like) comprises aluminum, the repair device preferably comprises aluminum or stainless steel. If the structural component comprises a carbon- or graphite-epoxy composite material, the repair device preferably comprises a stainless steel or a titanium alloy. The repair device may also comprise a composite material, such as carbon- or graphite-reinforced polymeric materials (e.g., carbon- or graphite-reinforced epoxy, carbon- or graphite-reinforced polyetheretherketone polymer, or the like).

It should be noted that, preferably, elements comprising the device according to the present invention for repairing a defective structural component are made as thin as possible. For example, a flange and a sleeve of the device exhibit thicknesses, in one embodiment, of about 0.2 millimeters. It should also be noted that any of the elements of the present invention may be trimmed, cut, or otherwise adapted to be operable with a structural component at the time of assembly with the structural component.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A repaired structural component, comprising:
   a structural component defining an opening;
   a plug bonded to the structural component and having a flange and a solid shank extending from the flange, the solid shank being disposed in the opening of the structural component and sealing the opening of the structural component; and
   a disc bonded to the structural component covering the opening of the structural component, the disc also being bonded to the solid shank;
   wherein the disc and the flange form a new opening extending through a thickness of the flange, the disc, and the structural component; and
   wherein the solid shank passes through the opening of the structural component and the new opening is positioned adjacent to the opening of the structural component.

2. The repaired structural component, according to claim 1, wherein the structural component defines a recess for receiving one of the flange of the plug and the disc.

3. The repaired structural component, according to claim 1, further comprising:
   a cover ply bonded to the structural component and at least one of the flange of the plug and the disc.

4. The repaired structural component, according to claim 1, wherein at least one surface of the plug and the disc is textured.

* * * * *